United States Patent [19]
Lin

[11] Patent Number: 6,106,208
[45] Date of Patent: Aug. 22, 2000

[54] SCREW WITH TWO CUT REMOVING CURVED GROOVES

[76] Inventor: Jack Lin, No. 15, Hsin Kuang Tsun, Kuan Miao Hsiang, Tainan Hsien, Taiwan

[21] Appl. No.: 09/159,396

[22] Filed: Sep. 23, 1998

Related U.S. Application Data

[63] Continuation-in-part of application No. 09/001,876, Dec. 31, 1997, abandoned.

[51] Int. Cl.[7] .............................. F16B 25/00; F16B 35/04
[52] U.S. Cl. ..................... 411/418; 411/387.2; 411/386
[58] Field of Search ................................... 411/386, 387, 411/418, 420, 421, 387.2

[56] References Cited

U.S. PATENT DOCUMENTS

| | | | |
|---|---|---|---|
| 453,563 | 6/1891 | Nicholson | 411/418 |
| 2,428,783 | 10/1947 | Cole | 411/418 X |
| 3,125,923 | 3/1964 | Hanneman | 411/386 |
| 3,451,080 | 6/1969 | McIntyre et al. | 411/418 X |
| 3,789,725 | 2/1974 | Lindstrom | 411/418 X |
| 4,673,323 | 6/1987 | Russo | 411/418 X |

*Primary Examiner*—Neill Wilson
*Attorney, Agent, or Firm*—Jiawei Huang; J.C. Patents

[57] ABSTRACT

A screw with two cut removing curved grooves has a head and a shank with a helical threads. The shank has two lengthwise grooves partially overlapping with each other, when viewed projectively from the horizontal surface or from the vertical surface of the center line or axis of the screw.

1 Claim, 6 Drawing Sheets

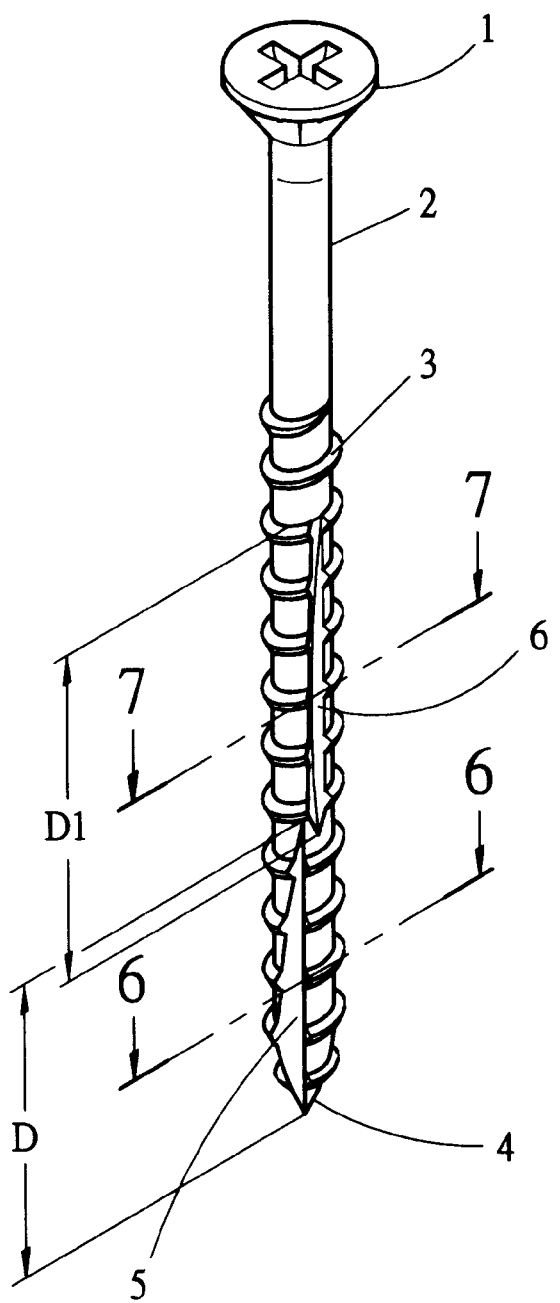
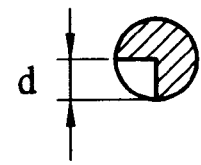
Fig 6
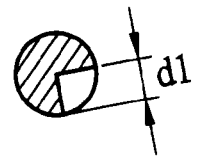
Fig 7
Fig 5

SCREW WITH TWO CUT REMOVING CURVED GROOVES

This invention concerns a screw with two cut removing curved grooves of continuation-in-part of Ser. No. 09/001, 876 filed Dec. 12, 1997, and it has been abandoned, particularly possible to be driven lightly and quickly into wood or other materials, without breaking of the screw or ripping of an object wood, even if the wood is very hard.

BACKGROUND OF THE INVENTION

Various kinds of conventional screws are widely known, such as shown in FIGS. 1–4. Those shown in FIGS. 1 and 2 have their ends formed with a multi-angled cone A or a cutting edge B so as to cut wood in their rotation. The FIGS. 3 and 4 show screws having their ends formed with a lengthwise groove C or a lengthwise cutting groove D.

However, those four kinds of conventional screws do not have good function in being driven in rather hard wood, still having drawbacks of breaking of screws and rippings in an object wood during driving action.

A known conventional screw disclosed in U.S. Pat. No. 3,492,908 has scrap grooves as shown in FIGS. 3, 4 and 5. The scrap grooves 13 are shaped curved and the same depth at a front and at the rear end, and there are three of them evenly provided from the bottom end. Each scrap groove 13 has two fifths of the length of the rod, as shown in FIG. 1, so when the screw of this patent runs in longer than the length of the scrap grooves 13, some wood scrap may not be able to be removed out, and possible to let the wood split, lowering the strength of the wood structure.

U.S. Pat. Nos. 2,278,411 and 951,437 have the nearly same structure, having the same advantage and the same disadvantage as U.S. Pat. No. 3,492,908, not described here.

Next, U.S. Pat. No. 1,465,148 has scrap grooves 7, 8 and 9 of triangle of a right angle, not easily made by wrought iron process as U.S. Pat. No. 2,278,411. In addition, the scrap grooves of the triangular right angled shape has a cutting function larger than the scrap removing function. Then the threads 14 for engaging wood are formed intermittently due to the scrap grooves 7, 8 and 9 extending from the bottm end to the head 5, decreased in its engaging force.

U.S. Pat. No. 4,673,323 has a scrap groove 18 of the same shape, a triangle with a right angle, and the difference between the two patents is the scrap grooves having different length only.

U.S. Pat. No. 877,131 has scrap grooves of a blade shape for cutting, with the same disadvantages as U.S. Pat. No. 1,465,148. Though the scrap grooves are plural, and formed spiral to extend from the bottm end to the head, they have insufficient engage force as U.S. Pat. No. 1,465,148.

SUMMARY OF THE INVENTION

This invention has been made to offer a kind of screw having little resistance in being driven, and quick in moving in a wood, without possibility of breaking of itself and ripping of an object wood during its driving action.

A feature of the invention is two lengthwise grooves formed in the shank of a screw. Each groove has any shape, but preferably of a curved lengthwise and extend from the end.

Another feature of the invention is that the grooves overlap or do not overlap when viewed projectrively from the horizontal surface of the axis of the screw.

One more feature of the invention is that the grooves overlap or do not overlap when viewed projectrively from the vertical surface of the axis of the screw.

BRIEF DESCRIPTION OF DRAWINGS

This invention will be better understood by reference to the accompanying drawings, wherein:

FIG. 5 is a perspective view of a screw in the present invention;

FIG. 6 is a cross-sectional view of line 6—6 in FIG. 5;

FIG. 7 is a cross-sectional view of line 7—7 in FIG. 5;

DESCRIPTION OF THE PREFERRED EMBODIMENT

Figure 1:
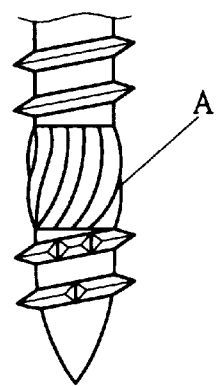
FIG. 1 is a partial front view of a first known conventional screw.
Figure 2:
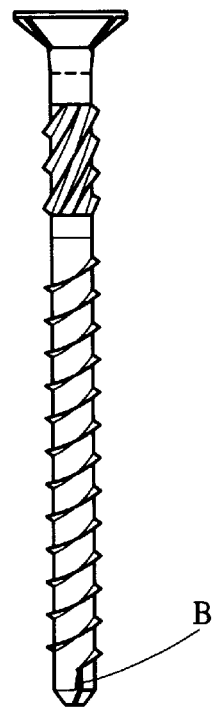
FIG. 2 is a front view of a second known conventional screw.
Figure 3:
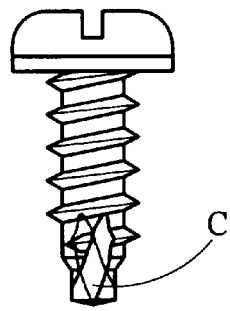
FIG. 3 is a front view of a third known conventional screw.
Figure 4:
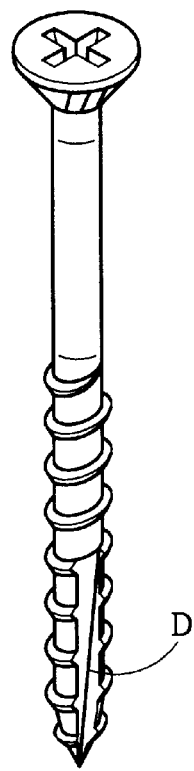
FIG. 4 is a perspective view of a fourth known conventional screw.
Figure 8:
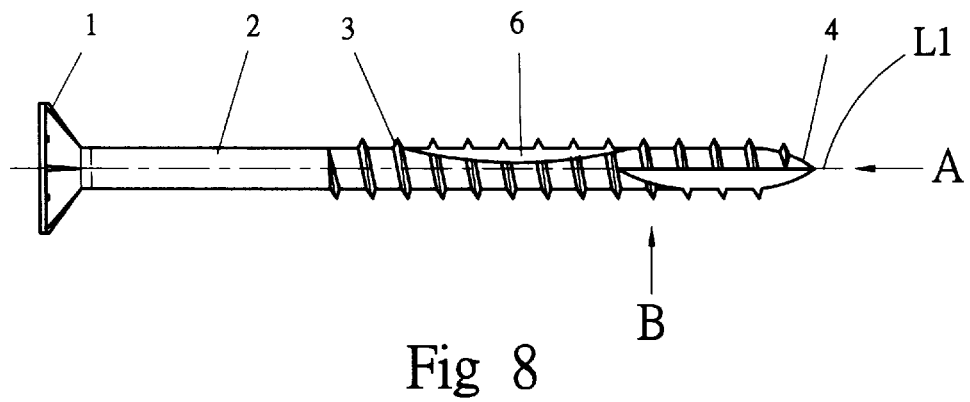
FIG. 8 is a side horizontal view of the screw in the present invention.
Figure 9:
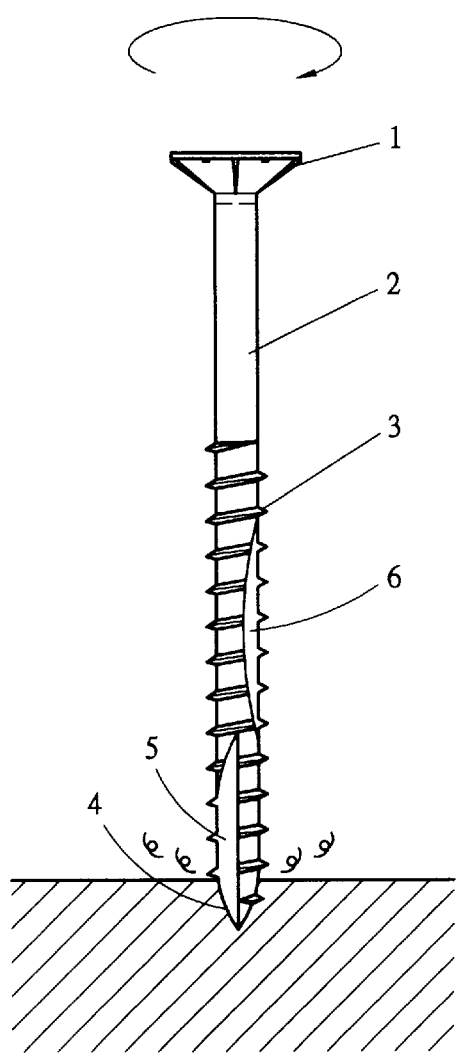
FIG. 9 is a side view of the screw in the present invention, showing it being driven in an object (wood)
Figure 10:
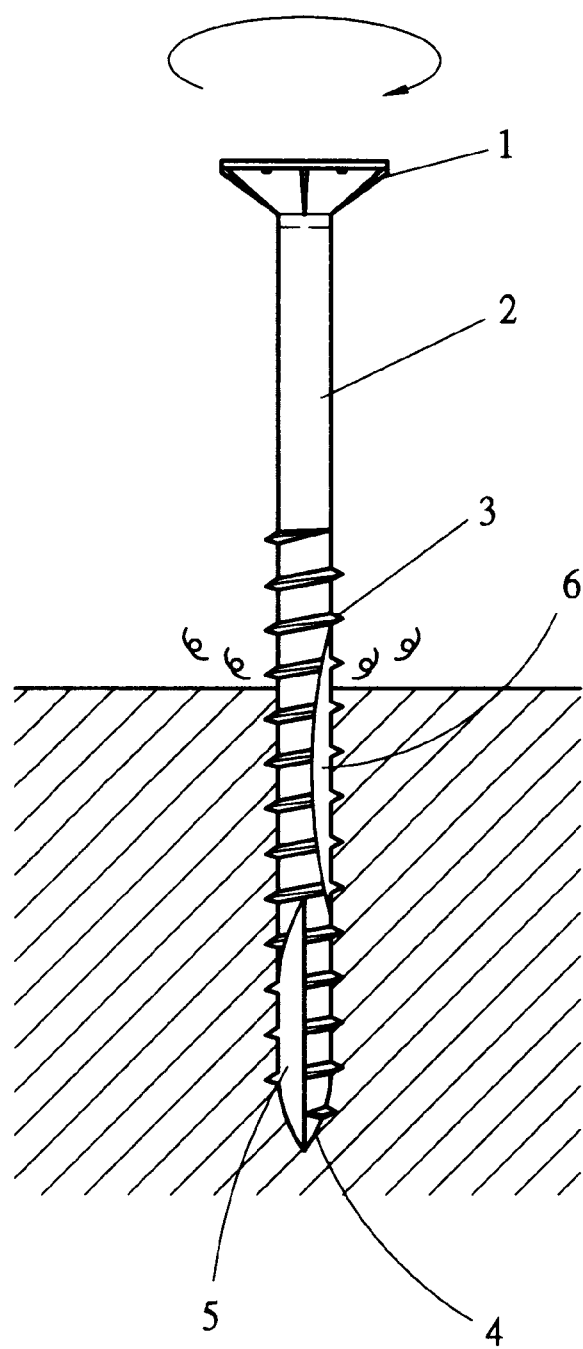
FIG. 10 is a side view of the screw in the present invention, showing it already driven for a substantive length in the object (wood).
Figure 11:
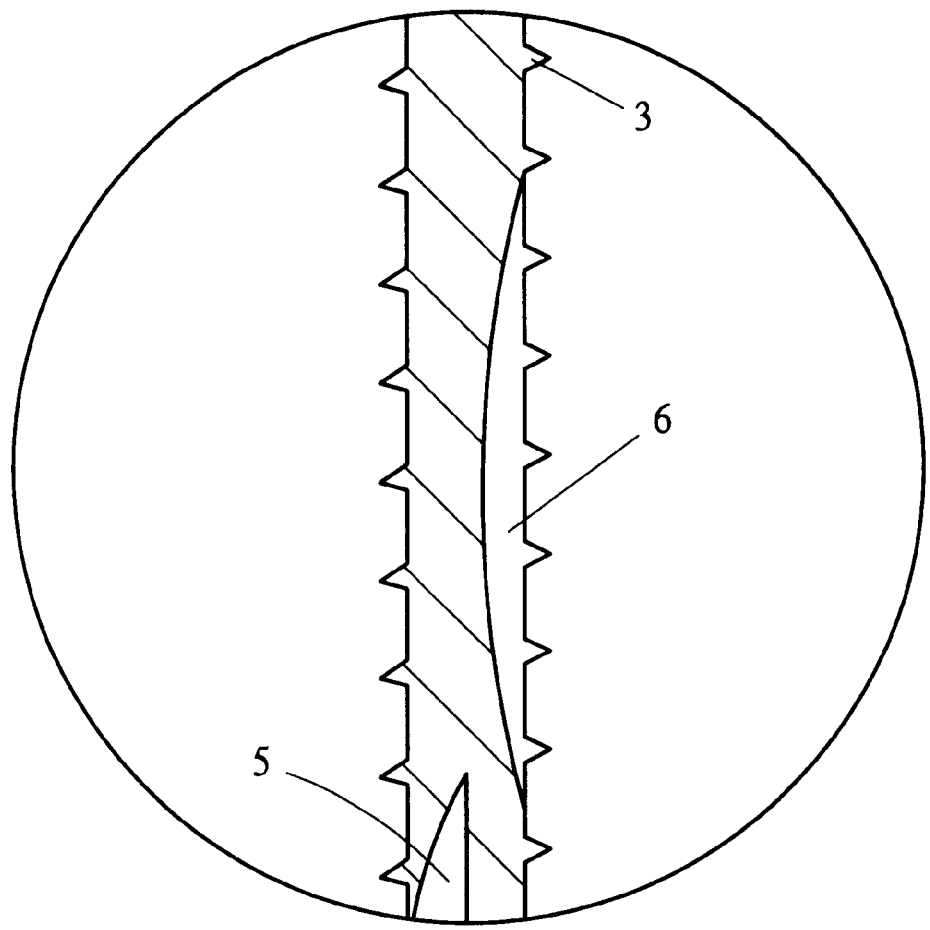
FIG. 11 is a cross-sectional view of the groove 6.

A preferred embodiment of a screw in the present invention, as shown in FIGS. 5 and 8, includes a flat head 1 and a shank 2 extending down from the head 1. The shank 2 is provided with helical threads 3 on a substantial length of the shank 2, and a pointed end 4, and two lengthwise grooves 5 (a first) and 6 (a second) thereof. The first groove 5 extends upward from the pointed end 4, having a length D with a little curvature and the second groove 6 extends upward from the level about on upper end of the first groove 5, having a length D1 with a little curvature. The lengths D and D1 may be equal or unequal, larger than 0 but smaller than the length of the shank 2. The first groove 5 has a depth d and the second groove 6 a depth d1, and the depths d and d1 may be larger than 0 but smaller than the diameter of the helical threads 3. The grooves 5 and 6 have any angle in their cross-section and their angle are equal or unequal to each other. In addition, the first and the second groove 5 and 6 may be partially overlapped with each other when viewed projectively from the horizontal surface of the center line L1 of the shank (as shown by the direction marked A in FIG. 8) or from the vertical surface of the center line L1 of the shank (as shown by the direction marked B in FIG. 8). Besides, the two grooves 5 and 6 can hold therein wood scrapes out off by the helical threads 3, and consequently the portion of the wood around the helical threads may not be pressed so hard that the object cannot be ripped. Even the first groove 5 does not start from the pointed end 4, it may have the same function, so the screw according to the present invention can be driven into the most hard wood or the similar material with fast speed, but the screw cannot be broken or the object cannot be ripped during driving action. The grooves 5 and 6 are shaped as a recessed curve as shown in FIG. 11 to have an advantage of easily cutting.

While the preferred embodiment of the invention has been described above, it will be recognized and understood that various modification may be made therein and the appended claims are intended to cover all such modifications which may fall within the spirit and scope of the invention.

What is claimed is:

1. A screw with two cut removing curved grooves comprising ahead and a shank substantially provided with helical threads, said shank having a pointed end, and characterized in that said shank has a first lengthwise groove and a second lengthwise groove partially overlapping with each other, said first and second grooves respectively having a curvature so that the -depth of said grooves is larger than 0 but smaller than the outer diameter of said threads, and the length of said grooves is larger than 0 but smaller than the whole length of said shank; said first lengthwise groove extends upward from the pointed end; and said second lengthwise groove extends upward from the level about on upper end of the first lengthwise groove.

* * * * *